(12) United States Patent
Ning et al.

(10) Patent No.: US 8,594,086 B2
(45) Date of Patent: Nov. 26, 2013

(54) PACKET DIVERSION METHOD AND DEEP PACKET INSPECTION DEVICE

(71) Applicant: Huawei Technologies Co., Ltd., Guangdong (CN)

(72) Inventors: Zhiming Ning, Shenzhen (CN); Hao Chen, Beijing (CN); Liang Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/706,063

(22) Filed: Dec. 5, 2012

(65) Prior Publication Data

US 2013/0094511 A1 Apr. 18, 2013

Related U.S. Application Data

(63) Continuation of application No. PCT/CN2011/079915, filed on Sep. 21, 2011.

(30) Foreign Application Priority Data

Nov. 4, 2010 (CN) .......................... 2010 1 0532260

(51) Int. Cl.
*H04L 12/28* (2006.01)
*H04J 1/16* (2006.01)

(52) U.S. Cl.
USPC ............................ 370/389; 370/282; 370/471

(58) Field of Classification Search
USPC .......................................... 370/282, 389, 471
See application file for complete search history.

(56) References Cited

U.S. PATENT DOCUMENTS

| 7,536,693 | B1 | 5/2009 | Manczak et al. |
| 2008/0201772 | A1 | 8/2008 | Mondaeev et al. |
| 2010/0103837 | A1* | 4/2010 | Jungck et al. ................. 370/252 |
| 2010/0189004 | A1 | 7/2010 | Mirandette et al. |

FOREIGN PATENT DOCUMENTS

| CN | 101102184 A | 1/2008 |
| CN | 101102273 A | 1/2008 |
| CN | 101237404 A | 8/2008 |
| CN | 101984598 A | 3/2011 |

OTHER PUBLICATIONS

Extended European Search Report in corresponding European Patent Application No. 11837514.6 (Apr. 25, 2013).

(Continued)

*Primary Examiner* — John Pezzlo
(74) *Attorney, Agent, or Firm* — Leydig, Voit & Mayer, Ltd.

(57) ABSTRACT

A packet diversion method and a DPI device are disclosed in the present invention. The method includes: receiving a packet, where the packet contains a user identifier; according to the user identifier and preset first correspondence between the user identifier and a service type, searching for the service type corresponding to the user identifier in the packet; adding an inner virtual local area network Vlan header to the packet according to the service type, preset second correspondence between a service type and a slave device identifier, and preset third correspondence between a slave device identifier and each bit in a diversion identifier field; and diverting the packet to a corresponding slave device according to the diversion identifier in the diversion identifier field. The inner Vlan header carrying the diversion identifier field is added to the packet, to indicate diversion of the packet in a same cluster.

10 Claims, 5 Drawing Sheets

(56) References Cited

OTHER PUBLICATIONS

Written Opinion of the International Searching Authority in corresponding PCT Patent Application No. PCT/CN2011/079915 (Jan. 5, 2012).
Cieslak et al., "Web Cache Communication Protocol v2.0," Apr. 3, 2001, IETF, Fremont, California.
"Requirements of Deep Packet Inspection in Packet-Based Networks and NGN Environment," Sep. 2-12, 2009, ITU-T, Geneva, Switzerland.
Miyamoto et al., "Customizing Network Functions for High Performance Cloud Computing," 2009, IEEE, New York, New York.
International Search Report in corresponding PCT Patent Application No. PCT/CN2011/079915 (Jan. 5, 2012).

* cited by examiner

| DMAC | SMAC | TYPE | IP | DATA |

| DMAC | SMAC | 0x8100 | Vlan ID | TYPE | IP | DATA |

PACKET DIVERSION METHOD AND DEEP PACKET INSPECTION DEVICE

CROSS-REFERENCE TO RELATED APPLICATIONS

This application is a continuation of International Patent Application No. PCT/CN2011/079915, filed on Sep. 21, 2011, which claims priority to Chinese Patent Application No. 201010532260.5, filed on Nov. 4, 2010, both of which are hereby incorporated by reference in their entireties.

FIELD OF THE INVENTION

The present invention relates to the field of network communications, and in particular, to a packet diversion method and a deep packet inspection device.

BACKGROUND OF THE INVENTION

With the development of Internet technologies, functions of a network device become more and more abundant. Therefore, monitoring of a network becomes increasingly essential.

At present, the network device monitors the network by analyzing and monitoring traffic and a packet. Different network devices have different emphases during packet processing, and support different bandwidths. Therefore, a cluster usually needs to be formed during deployment, to satisfy packet processing requirements through assistance among network devices in analysis.

During a process of implementing the present invention, the inventor finds that:

In the foregoing deployment pattern, an application scenario may occur, that is, one packet needs to be transferred to multiple network devices in a same cluster in sequence, where each network device in the cluster has a specific analysis and processing function, and then the same packet needs to be diverted between the network devices in the same cluster. The diversion refers to a process that one network device gives a packet to another network device for processing, and the other network device returns the packet after the processing is completed. However, in the prior art, there is no technical solution for packet diversion yet.

SUMMARY OF THE INVENTION

An objective of embodiments of the present invention is to provide a packet diversion method and a deep packet inspection device, so as to solve a problem of packet diversion.

An embodiment of the present invention provides a packet diversion method, including:

receiving a packet, where the packet contains a user identifier;

according to the user identifier and preset first correspondence between the user identifier and a service type, searching for the service type corresponding to the user identifier in the packet;

adding an inner virtual local area network Vlan header to the packet according to the service type, preset second correspondence between a service type and a slave device identifier, and preset third correspondence between a slave device identifier and each bit in a diversion identifier field, where the inner Vlan header includes a diversion identifier field, and the diversion identifier field contains a diversion identifier; and diverting the packet to a corresponding slave device according to the diversion identifier in the diversion identifier field, where the packet carries the inner Vlan header, and at least one such slave device is included.

An embodiment of the present invention further provides a deep packet inspection device, including:

a receiving unit, configured to receive a packet, where the packet contains a user identifier;

a searching unit, configured to search, according to the user identifier and preset first correspondence between the user identifier and a service type, for the service type corresponding to the user identifier in the packet;

a processing unit, configured to add an inner virtual local area network Vlan header to the packet according to the service type, preset second correspondence between a service type and a slave device identifier, and preset third correspondence between a slave device identifier and each bit in a diversion identifier field, where the inner Vlan header includes a diversion identifier field, and the diversion identifier field contains a diversion identifier; and a diverting unit, configured to divert the packet to a corresponding slave device according to the diversion identifier in the diversion identifier field, where the packet carries the inner Vlan header, and at least one such slave device is included.

The packet diversion method and deep packet inspection device in the embodiments of the present invention provide a solution to packet diversion. An inner Vlan header carrying a diversion identifier field is added to a packet, to indicate diversion of the packet in a same cluster, thereby reducing a processing load of the DPI (Deep Packet Inspection) device, and supporting a user in customizing multiple different personalized services.

BRIEF DESCRIPTION OF THE DRAWINGS

To illustrate technical solutions in embodiments of the present invention more clearly, accompanying drawings required for describing the embodiments are introduced below briefly. Apparently, the accompanying drawings in the following descriptions are only some of the embodiments of the present invention, and persons of ordinary skill in the art can obtain other drawings according to these accompanying drawings without creative efforts.

DETAILED DESCRIPTION OF THE EMBODIMENTS

In order to make objectives, characteristics and advantages of embodiments of the present invention more obvious and comprehensible, the embodiments of the present invention are further illustrated in detail in the following with reference to accompanying drawings and specific implementation manners.

Embodiment 1

Figure 1:
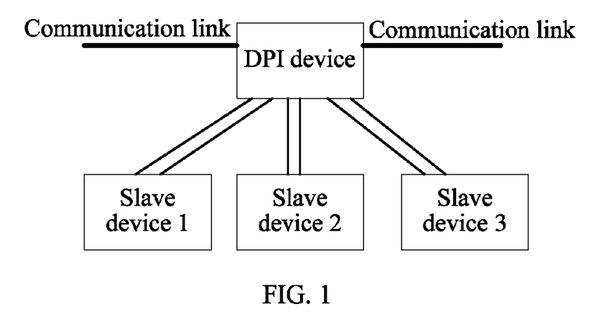
FIG. 1 is a schematic architectural diagram of a DPI device and slave devices in a same cluster according to an embodiment of the present invention.
Figure 2:
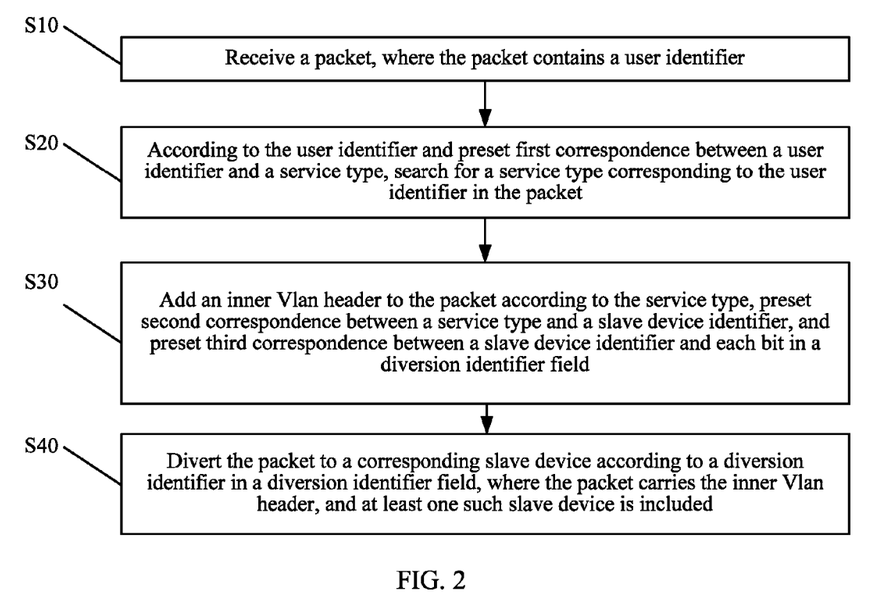
FIG. 2 is a schematic flow chart of a first embodiment of a packet diversion method according to an embodiment of the present invention.

At least one slave device may be attached to a DPI (Deep Packet Inspection) device of this embodiment. As shown in FIG. 1, the DPI device has a simple service processing capability, and each slave device has a specific analysis and processing function such as anti-virus, URL (Uniform Resource Locator) filtering, or WAN (wide area network) acceleration. The DPI device forwards a packet to a specific slave device to implement a corresponding function. As shown in FIG. 2, a packet diversion method in this embodiment includes the following steps.

S10: Receive a packet, where the packet contains a user identifier.

S20: According to the user identifier and preset first correspondence between the user identifier and a service type, search for the service type corresponding to the user identifier in the packet.

Because the DPI device is located between a core network and a user, the DPI device may provide a customized service for a user within its control scope. If the packet is an uplink packet, the user identifier in the packet is an identifier of a user that sends the packet, and the identifier of the user that sends the packet may be a source IP (Internet protocol) address, a user account, and so on. If the packet is a downlink packet, the user identifier is an identifier of a user that receives the packet, and the identifier of the user that receives the packet may be a destination IP address, a user account, and so on. Because a user identifier and a user are in one-to-one correspondence, so after a user customizes a service type complying with a personalized requirement, the DPI device may implement a customized service for the user by establishing first correspondence between the user identifier of the user and the service type customized by the user. The service type may include anti-virus, URL filtering, WAN acceleration, and so on. The user may customize a same service for uplink and downlink packets, and may also customize different services for the uplink packet and downlink packet. When services customized for the uplink packet and downlink packet are different, the first correspondence need to be distinguished as first correspondence for the uplink packet and first correspondence for the downlink packet, where a packet attribute (uplink or downlink) may be determined according to an attribute of an incoming link port (uplink port or downlink port) through which the packet enters the DPI device.

A typical DPI device usually includes a traffic distribution module and a processing module that are located in a foreground, and a web page configuration module and a database that are located in a background. When the quantity of the first correspondence is small, the first correspondence may be stored in the traffic distribution module; when the quantity of the first correspondence is large, the first correspondence may be stored in the database in the background of the DPI device.

S30: Add an inner virtual local area network Vlan header to the packet according to the service type, preset second correspondence between a service type and a slave device identifier, and preset third correspondence between a slave device identifier and each bit in a diversion identifier field, where the inner Vlan header includes a diversion identifier field, and the diversion identifier field contains a diversion identifier.

A Vlan technology is a technology that implements a virtual work group by logically dividing devices in a local area network into network segments, and provides a protocol that solves broadcasting and security problems of the Ethernet, where a Vlan header is added on the basis of an Ethernet frame, and users are divided into smaller work groups through the Vlan, limiting two-layer access between users of different work groups.

Figure 3:
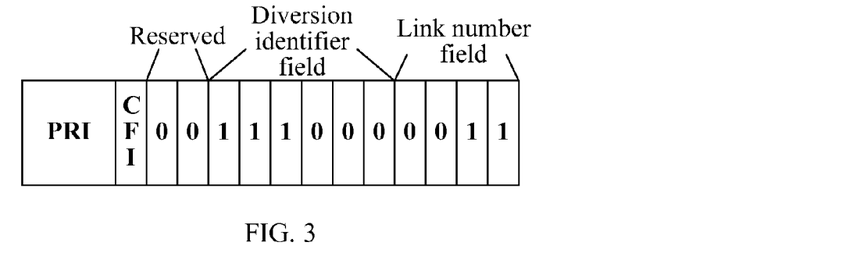
FIG. 3 is a schematic diagram of an inner Vlan header according to the present invention.

An existing Vlan header has 16 bits in total, where a field represented by the first 3 bits is PRI (a priority level), a field represented by the fourth bit is a CFI (Canonical Format Indicator), and all the last 12 bits are reserved fields. This embodiment is about the application of the reserved fields of the last 12 bits, and the first 4 bits remain unchanged. The inner Vlan header may include the diversion identifier field, and may further include a link number field, where the diversion identifier field contains the diversion identifier, and the diversion identifier may be represented by 1 or 0, which definitely does not serve as a limitation. As shown in FIG. 3, it is a schematic structural diagram of an inner Vlan header. The last 12 bits of the inner Vlan header contain the diversion identifier field and the link number field. The quantity of bits of the diversion identifier field may be the same as the quantity of slave devices attached to the DPI device, and may also be greater than the quantity of slave devices.

The service type and the slave device identifier are in the second correspondence, and the second correspondence is preset in the DPI device. Through the second correspondence, a service customized by the user may be embodied in a slave device that provides the service, where the packet sent/received by the user is diverted to the slave device that provides the corresponding service, thereby providing the user with the service customized by the user.

The slave device identifier and each bit in the diversion identifier field are in the third correspondence, and the third correspondence is preset in the DPI device. Through the third correspondence, when adding the inner Vlan header to the packet, the DPI device may determine how to set the diversion identifier field, so as to indicate a subsequent diversion operation. The diversion identifier field contains the diversion identifier. There is a diversion identifier in a bit corresponding to a slave device to which the packet needs to be diverted, and there is a non-diversion identifier in a bit corresponding to a slave device to which the packet does not need to be diverted. Specifically, when the diversion identifier field is set, a value of the bit corresponding to the slave device to which the packet needs to be diverted is set to 1, and a value of the bit corresponding to the slave device to which the packet does not need to be diverted is set to 0. Definitely, the value of the bit corresponding to the slave device to which the packet needs to be diverted may also be set to 0, and the value of the bit corresponding to the slave device to which the packet does not need to be diverted may also be set to 1. The foregoing two setting manners do not serve as a limitation, and the setting manner may be determined according to a specific requirement.

In practical applications, because the quantity of second correspondence and the quantity of third correspondence are both not large, the second correspondence and the third correspondence may be stored in the traffic distribution module in the foreground of the DPI device.

S40: Divert the packet to a corresponding slave device according to the diversion identifier in the diversion identifier field, where the packet carries the inner Vlan header, and at least one such slave device is included.

In the networking structure shown in FIG. 1, two-arm networking is adopted for the DPI device and each slave device. The DPI device sends, through one of two arms, the slave device the packet carrying the inner Vlan header, and after processing the packet, the slave device returns the packet to the DPI device through the other of the two arms.

In practical applications, the DPI device may independently record an entire diversion operation process of the packet in itself, and divert the packet to the corresponding slave device in sequence according to order from left to right or from right to left of the diversion identifier in the diversion identifier field of the inner Vlan header, which may avoid missing diversion or repeating the diversion operation.

The DPI device may also not record the diversion operation process in itself; and instead, the diversion operation process is recorded in the diversion identifier field of the inner Vlan header and diverted together with the packet.

Figure 4:
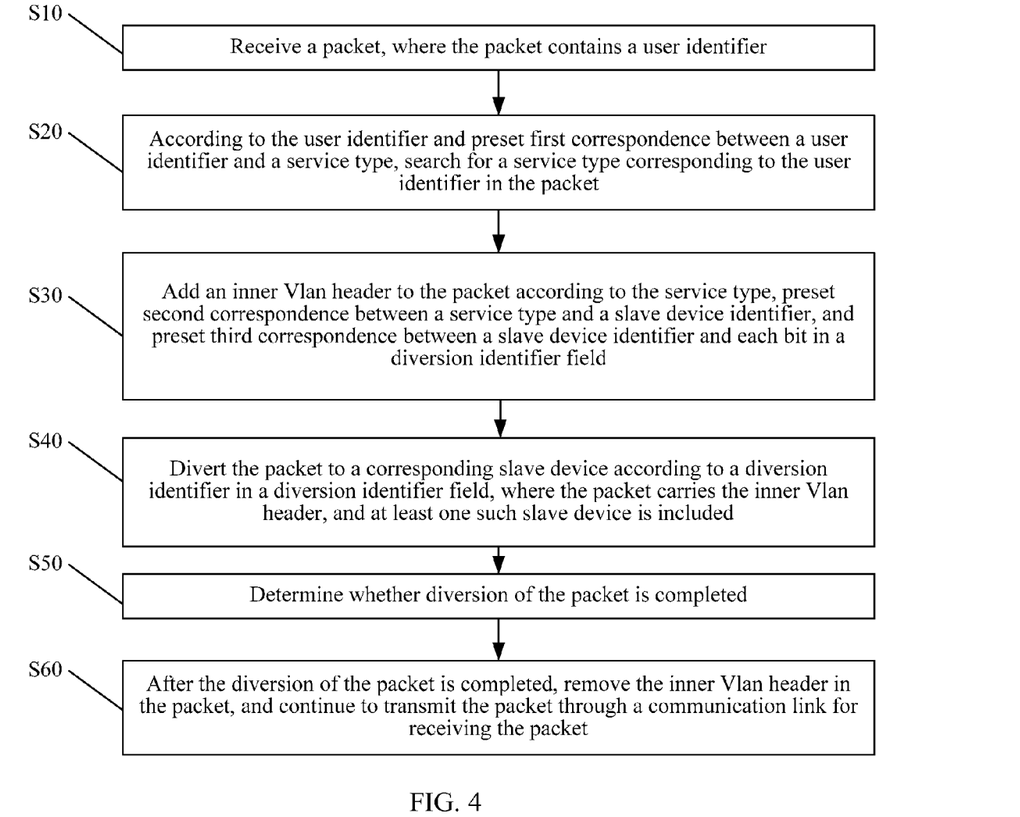
FIG. 4 is a schematic flow chart of a second embodiment of a packet diversion method according to an embodiment of the present invention.

In another implementation manner, after diversion of the packet is completed through the foregoing steps, as shown in FIG. 4, the method further includes:

S50: Determine whether the diversion of the packet is completed.

Specifically, when the packet only needs to be diverted to one slave device, that the diversion of the packet is completed means that diversion of the packet between the DPI device and the slave device is completed; when the packet needs to be diverted to multiple slave devices, that the diversion of the packet is completed means that diversion of the packet between the DPI device and all slave devices is completed. That is to say, when the packet only needs to be diverted to one slave device, the diversion of the packet is completed as long as the diversion of the packet is completed once. When the packet needs to be diverted to multiple slave devices, the diversion of the packet is not completed until multiple times of diversion of the packet are completed.

Specifically, in a process of determining whether the diversion of the packet is completed, different processing may be performed according to different manners of recording the diversion operation process. If the DPI device independently records the entire diversion operation process of the packet in itself, when a record of the packet diversion process indicates that the diversion of the packet is completed, it is confirmed that the diversion of the packet is completed; if a manner that the diversion operation process is recorded in the diversion identifier field and diverted together with the packet is adopted, when the diversion identifier field of the packet diverted back includes no diversion identifier, it is confirmed that the diversion of the packet is completed; otherwise, it is considered that the diversion of the packet is not completed.

Specifically, in the process of determining whether the diversion of the packet is completed, in a case where the DPI device does not record the diversion operation process, in order to prevent repeated diversion or missing diversion operations, in a diversion process, the DPI device may have two operation modes. In the first mode, before the packet carrying the inner Vlan header is to be diverted to a slave device, a bit which is in the diversion identifier field and corresponds to the slave device is set to a diversion completion identifier from the diversion identifier, and then the packet is diverted to the slave device. In the second mode, after the packet carrying the inner Vlan header is diverted back from a certain slave device, a bit which is in the diversion identifier field and corresponds to the slave device is set to a diversion completion identifier from the diversion identifier. The diversion identifier may be 1, and the diversion completion identifier may be 0. Alternatively, the diversion identifier may be 0, and the diversion completion identifier may be 1. It can be understood that, the diversion completion identifier may be represented by a same identifier as that of the non-diversion identifier. However, the diversion completion identifier should be distinguished from the diversion identifier, and the diversion identifier should also be distinguished from the non-diversion identifier. The diversion identifier, the non-diversion identifier, and the diversion completion identifier may be set according to a predetermined policy. The diversion identifier indicates that the packet needs to be diverted to a slave device corresponding to the bit, the non-diversion identifier indicates that the packet is not diverted to a slave device corresponding to the bit, and the diversion completion identifier indicates that the packet has already been diverted to a slave device corresponding to the bit.

It is taken as an example that the diversion identifier is 1, the non-diversion identifier is 0, the diversion completion identifier is 0, and during the packet diversion, the DPI device diverts the packet to corresponding slave devices in sequence according to order from the left to the right of the diversion identifier field, to describe the foregoing two operation modes in detail in the following.

In the first mode, before the packet is diverted to a certain slave device, a bit which is in the diversion identifier field and corresponds to the slave device is set to the diversion completion identifier from the diversion identifier, and then the packet is diverted to the slave device. Specifically, after the DPI device adds the inner Vlan header to the packet, the DPI device first checks a first bit with a value of 1 from the left to the right of the diversion identifier field of the inner Vlan header, determines slave device A corresponding to the bit is a first slave device to which the packet is diverted, then sets a value of the bit in the diversion identifier field to the diversion completion identifier 0 from the diversion identifier 1, and diverts the packet to slave device A, where the packet carries the inner Vlan header. After the packet is returned from slave device A, the DPI device checks a first bit with a value of 1 from the left to the right in the diversion identifier field again, determines that slave device B corresponding to the bit is a second slave device to which the packet is diverted, then sets a value of the bit, which is in the diversion identifier field and corresponds to slave device B, to the diversion completion identifier 0 from the diversion identifier 1, and diverts the packet to slave device B, where the packet carries the inner Vlan header. The foregoing process is repeated, and then S50 may specifically be: determining whether each bit in the diversion identifier field of the packet diverted back from the slave device is the non-diversion identifier or diversion completion identifier, that is, determining whether values of all bits in the diversion identifier field of the packet diverted back from a certain slave device are 0, where if all are 0, it indicates that all diversion operations of the packet are completed in sequence.

In the second mode, after the packet is diverted back from a certain slave device, a bit which is in the diversion identifier field and corresponds to the slave device is set to the diversion completion identifier from the diversion identifier. Specifically, when the DPI device adds the inner Vlan header to the packet, the DPI device first checks a first bit with a value of 1 from the left to the right of the diversion identifier field, determines that slave device A corresponding to the bit is a first slave device to which the packet is diverted, and then diverts the packet to slave device A, where the packet carries the inner Vlan header. After the packet is returned from slave device A, the DPI device sets a value of the bit, which is in the diversion identifier field and corresponds to slave device A, to the diversion completion identifier 0 from the diversion identifier 1, then checks a first bit with a value of 1 from the left to the right in the diversion identifier field, determines that slave device B corresponding to the bit is a second slave device to which the packet is diverted, and diverts the packet to the second slave device B, where the packet carries the inner Vlan header. After the packet is returned from slave device B, the DPI device sets a value of the bit, which is in the diversion identifier field and corresponds to slave device B, to the diversion completion identifier 0 from the diversion identifier 1. The foregoing process is repeated, and then S50 may specifically be: after the bit which is in the diversion identifier field and corresponds to the slave device is set to the diversion completion identifier, determining whether each bit in the diversion identifier field of the packet is the non-diversion identifier or diversion completion identifier, that is, after the DPI device sets a diversion identifier 1 corresponding to a certain slave device to the diversion completion identifier 0, determining whether values of all bits in the diversion identifier field are 0, where if all are 0, it indicates that all diversion operations of the packet are completed in sequence.

In practical applications, the DPI device may adopt a same operation mode for slave devices in a same group.

It should be noted that, in the packet diversion process, the slave device only processes the packet, but does not perform any operation on the inner Vlan header.

In this way, the packet can be diverted between the DPI device and the slave device attached to it.

S60: After the diversion of the packet is completed, remove the inner Vlan header in the packet, and continue to transmit the packet through a communication link for receiving the packet.

Specifically, if the DPI device independently records the entire diversion operation process of the packet, when the record of the packet diversion process indicates that the diversion of the packet is completed, it is confirmed that the diversion of the packet is completed; if the DPI device does not independently record the diversion operation process, and the diversion operation process is recorded in the diversion identifier field of the inner Vlan header and diverted together with the packet, when the diversion identifier field of the packet diverted back includes no diversion identifier, it is confirmed that the diversion of the packet is completed.

After the diversion of the packet is completed, the DPI device removes the inner Vlan header in the packet, and continues to transmit the packet through the communication link for receiving the packet.

Further, the DPI device may also record a link number of the link when receiving the packet through the communication link, so as to, after the diversion of the packet is completed, continue to transmit the packet through the communication link corresponding to the link number recorded.

Further, the DPI device may also add the link number of the link to the inner Vlan header, that is, the inner Vlan header further includes a link number field corresponding to the link, and the DPI device continues to transmit the packet through a communication link corresponding to a link identifier in the link number field in the inner Vlan header.

In practical applications, the reserved field in the Vlan header is the last 12 bits; and for a service requirement that the user possibly has in a period of time in further, 8 slave devices may basically satisfy personalized customization of the user, a 4-bit link number field may distinguish 16 links, and may also basically satisfy a network development scale within a period of time in the future. Therefore, preferably, the diversion identifier field of the inner Vlan header may be set to be of 8 bits, and the link number field may be set to be of 4 bits. In addition, it should be noted that, order of the diversion identifier field and the link number field is not limited in the embodiment of the present invention. An advantage of carrying the link number for packet transmission in the link number field of the inner Vlan header is that a recording load of the DPI device may be reduced. When the link number is carried in the inner Vlan header and diverted together with the packet, if the packet does not comply with a rule customized by the user and is filtered out during the diversion process, it is unnecessary for the DPI device to record the link number of the packet. Moreover, except the first step of adding the inner Vlan header, all subsequent processes may be completed by the traffic distribution module, which makes packet processing efficiency of the DPI device higher.

The packet diversion method in this embodiment provides a solution to the packet diversion. An inner Vlan header carrying the diversion identifier field is added to the packet, to indicate multiple times of diversion of the packet in a same cluster, thereby reducing the processing load of the DPI device. The packet diversion method in this embodiment supports the user in customizing multiple different personalized services.

Embodiment 2

Figure 5:
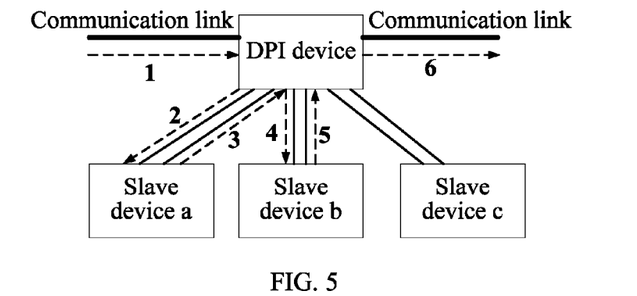
FIG. 5 is a schematic diagram of transmission directions of a packet between a DPI device and slave devices according to a third embodiment of the present invention.

This embodiment is a specific embodiment of a packet diversion method. It is assumed that one cluster includes a DPI device and three slave devices (referring to FIG. 5): slave device a, slave device b, and slave device c that are managed by the DPI device. A function of slave device a is anti-virus, a function of slave device b is URL filtering, and a function of slave device c is WAN acceleration. Each slave device can communicate with the DPI device only, and the slave devices cannot communicate with each other.

Figure 6:
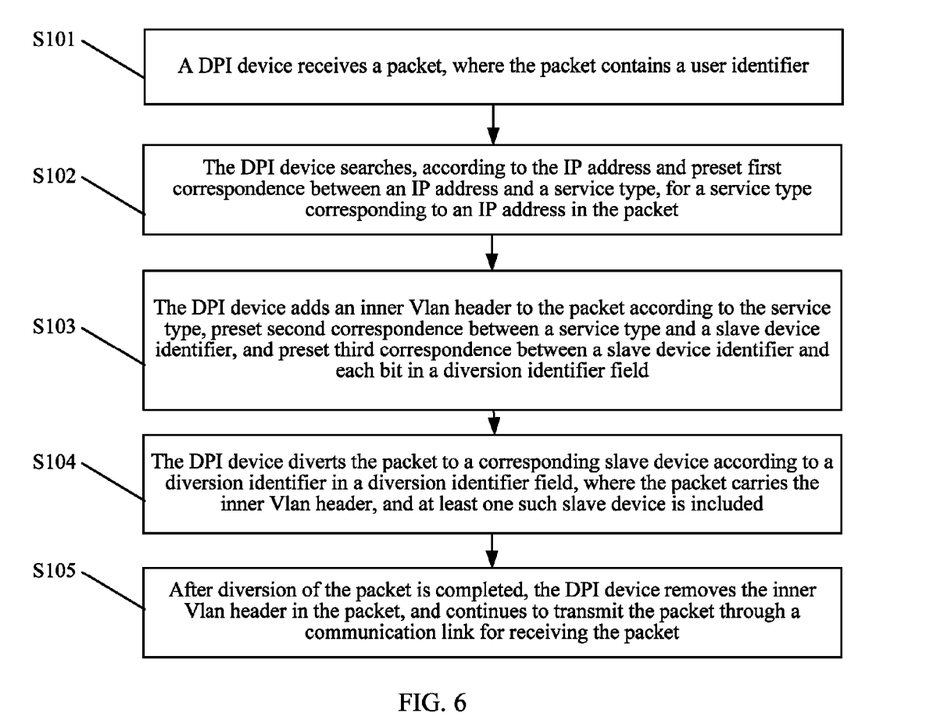
FIG. 6 is a schematic flow chart of a third embodiment of a packet diversion method according to an embodiment of the present invention.

As shown in FIG. 6, the method includes:

S101: A DPI device receives a packet, where the packet contains a user identifier.

S102: The DPI device searches, according to an IP address and preset first correspondence between the IP address and a service type, for the service type corresponding to an IP address in the packet.

Figure 7:
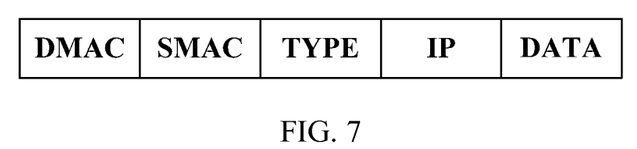
FIG. 7 is a schematic diagram of a packet without an added inner Vlan header according to an embodiment of the present invention.

The packet is shown in FIG. 7. If the packet is a downlink packet, and a service type corresponding to a destination IP address of the packet includes anti-virus and URL filtering, the packet needs to be diverted to slave device a and slave device b.

S103: The DPI device adds an inner Vlan header to the packet according to the service type, preset second correspondence between a service type and a slave device identifier, and preset third correspondence between a slave device identifier and each bit in a diversion identifier field.

Figure 8:
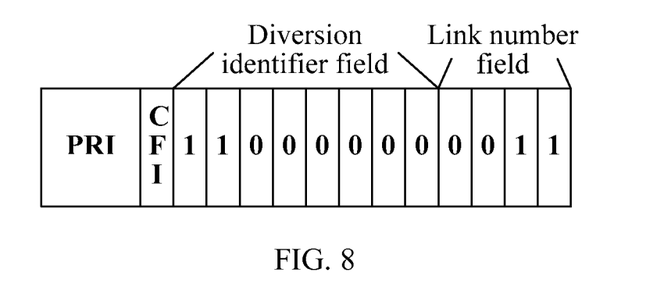
FIG. 8 is a schematic diagram of an inner Vlan header according to the third embodiment of the present invention.
Figure 9:
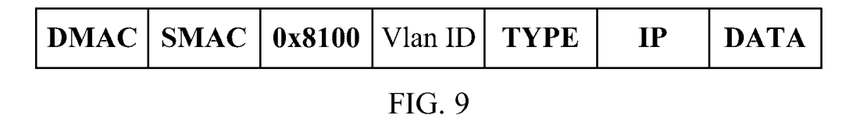
FIG. 9 is a schematic diagram of a packet with an inner Vlan header added according to the third embodiment of the present invention.

The inner Vlan header in this embodiment includes an 8-bit diversion identifier field and a 4-bit link number field, as shown in FIG. 8. In the second correspondence, a slave device identifier corresponding to anti-virus is a, and a slave device identifier corresponding to URL filtering is b. In the third correspondence, slave device a corresponds to the first bit in the diversion identifier field, and slave device b corresponds to the second bit in the diversion identifier field. A link number of a link is 3. The packet with the inner Vlan header added is shown in FIG. 9, where "0x8100" is used to indicate that a Vlan header is added, "Vlan ID" is the inner Vlan header; "0x8100" and the Vlan header occupy 4 bytes altogether.

S104: The DPI device diverts the packet to a corresponding slave device according to a diversion identifier in the diversion identifier field, where the packet carries the inner Vlan header, and at least one such slave device is included.

The DPI adopting the second operation mode is taken as an example. The DPI device diverts the packet to slave device a, where the packet carries the inner Vlan header (dashed lines in FIG. 5 indicate transmission directions of the packet, where numbers 1 to 6 indicate packet transfer order); after receiving the packet returned from slave device a, sets a value of a bit, which is in the diversion identifier field and corresponds to slave device a, to 0, and then diverts the packet to slave device b; and after the packet is returned from slave device b, sets a value of a bit, which is in the diversion identifier field and corresponds to slave device b, to 0.

S105: After the diversion of the packet is completed, the DPI device removes the inner Vlan header in the packet, and continues to transmit the packet through a communication link for receiving the packet.

After the value of the bit which is in the diversion identifier field and corresponds to slave device b is set to 0, values of all bits in the diversion identifier field are 0, and then all diversion is completed. The DPI device removes the inner Vlan header in the packet, and continues to transmit the packet through an uplink port of a communication link with a link number of 3.

In a case where a switch is further included between the DPI device and each slave device, a two-layer Vlan may be constructed, for example, 802.1Q in 802.1Q. Fourth correspondence between a slave device identifier and a switch port number is configured on the DPI device. When the inner Vlan header is added to the packet, the DPI device adds an outer Vlan header to the packet according to the preset fourth correspondence between the slave device identifier and the switch port number, where a value of the outer Vlan header is a switch port number corresponding to a slave device to which the packet is to be diverted.

Figure 10:
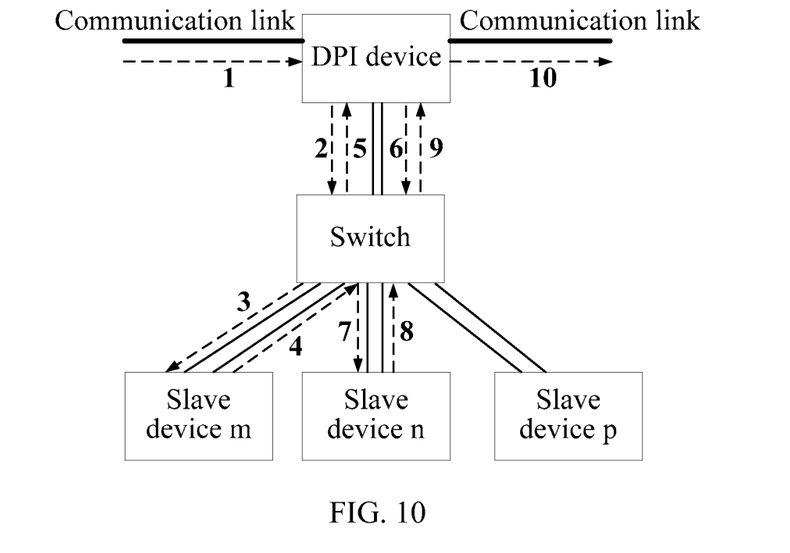
FIG. 10 is a schematic diagram of transmission directions of a packet between a DPI device and slave devices when a switch is included according to the third embodiment of the present invention.

The foregoing example is still taken for description. As shown in FIG. 10, a DPI device is connected to slave device m, slave device n, and slave device p through a switch. Dashed lines in FIG. 10 indicate transmission directions of a packet, where numbers 1 to 10 indicate packet transfer order. Switch ports corresponding to slave device m are (100, 101), where 100 is a sending port, and 101 is a receiving port. Switch ports corresponding to slave device n are (102, 103), and switch ports corresponding to slave device p are (104, 105). The DPI device may be connected to the switch through a trunk, and the trunk may release all the switch ports after being enabled.

After an inner Vlan header and outer Vlan header are added to the packet, the DPI device diverts the packet. The DPI first sends the switch the packet carrying the inner Vlan header and outer Vlan header. The switch determines, according to a value of the outer Vlan header, a switch port number of slave device m to which the packet is to be diverted, and diverts the packet to slave device m through a port 100, that is, diverts the packet to a corresponding slave device through a switch port corresponding to a value of the outer Vlan header. After completing processing of the packet, slave device m returns the packet to the switch through a port 101. The switch then returns the packet to the DPI device. The DPI device sets a bit, which is in the diversion identifier field of the inner Vlan header and corresponds to slave device m, to 0, and then searches for a next slave device to which the packet needs to be diverted. Because a value of the second bit in the diversion identifier field of the inner Vlan header is 1, the DPI device changes the switch port number in the outer Vlan header to 102, and the DPI device sends the packet to the switch. The switch diverts the packet to slave device n through a port 102 according to the switch port number in the outer Vlan header. After completing processing of the packet, slave device n returns the packet to the switch through a port 103. The switch then returns the packet to the DPI device. The DPI device sets a value of a bit, which is in the diversion identifier field of the inner Vlan header and corresponds to slave device n, to 0. At this time, because values of all bits in the diversion identifier field are 0, it indicates that all diversion is completed. After the diversion of the packet is completed, the DPI device removes the inner Vlan header and outer Vlan header in the packet. Afterwards, the DPI device continues to transmit the packet through the communication link for receiving the packet.

In a packet diversion process, the slave device processes the packet only, and does not perform any operation on the inner Vlan header and outer Vlan header. The switch only forwards the packet according to the switch port in the outer Vlan header, and does not perform any operation on the inner Vlan header and outer Vlan header either. The DPI device controls, through the outer Vlan header, the switch to divert the packet to the corresponding slave device, and records, through the inner Vlan header, a progress status of a packet diversion operation.

The packet diversion method of this embodiment provides a solution to packet diversion. The inner Vlan header carrying the diversion identifier field and the outer Vlan header is added to the packet, to indicate multiple times of diversion of the packet in a same cluster, thereby reducing a processing load of the DPI device, and meanwhile, supporting a user in customizing multiple different personalized services.

Embodiment 3

Figure 11:
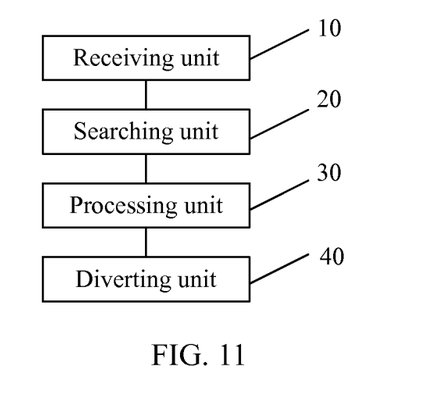
FIG. 11 is a schematic structural diagram of a first embodiment of a deep packet inspection device according to an embodiment of the present invention.

This embodiment provides a deep packet inspection device, where at least one slave device is attached to the deep packet inspection device. As shown in FIG. 11, the deep packet inspection device includes: a receiving unit 10, a searching unit 20, a processing unit 30, and a diverting unit 40.

The receiving unit 10 is configured to receive a packet, where the packet contains a user identifier.

The searching unit 20 is configured to search, according to the user identifier and preset first correspondence between the user identifier and a service type, for the service type corresponding to the user identifier in the packet.

Specifically, if the packet is an uplink packet, the user identifier is an identifier of a user that sends the packet, and the identifier of the user that sends the packet may be a source IP address, a user account, and so on. If the packet is a downlink packet, the user identifier is an identifier of a user that receives the packet, and the identifier of the user that receives the packet may be a destination IP address, a user account, and so on.

The processing unit 30 is configured to add an inner Vlan header to the packet according to the service type, preset second correspondence between a service type and a slave device identifier, and preset third correspondence between a slave device identifier and each bit in a diversion identifier field, where the inner Vlan header includes a diversion identifier field, and the diversion identifier field contains a diversion identifier.

Specifically, in the diversion identifier field, a bit corresponding to a slave device to which the packet needs to be diverted is the diversion identifier, and a bit corresponding to a slave device to which the packet does not need to be diverted is a non-diversion identifier, where the diversion identifier may be indicated by 1 or 0, and definitely is not limited to the foregoing two bits. In addition, the diversion identifier needs to be distinguished from the non-diversion identifier.

The diverting unit 40 is configured to divert the packet to a corresponding slave device according to the diversion identifier in the diversion identifier field, where the packet carries the inner Vlan header, and at least one such slave device is included.

In the deep packet inspection device provided in this embodiment, the inner Vlan header carrying the diversion identifier field is added to the packet, to indicate diversion of the packet in a same cluster, thereby reducing a processing load of the DPI device, and providing a user with a personalized service customized by the user.

Figure 12:
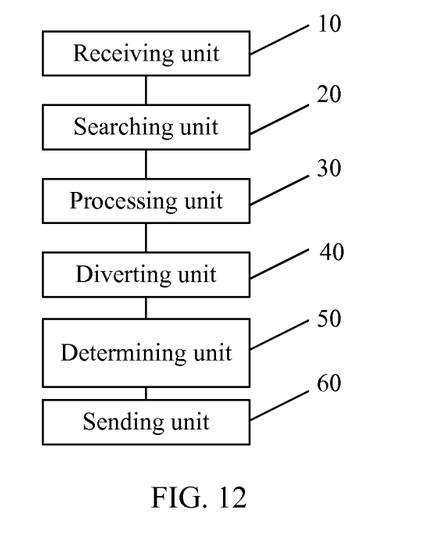
FIG. 12 is a schematic structural diagram of a second embodiment of a deep packet inspection device according to an embodiment of the present invention.

Referring to FIG. 12, in another embodiment of the present invention, on the basis of the embodiment of FIG. 11, the deep packet inspection device of FIG. 12 may further include:

a determining unit 50, configured to, after the packet is diverted, determine whether diversion of the packet is completed, where specifically, when the packet only needs to be diverted to one slave device, that the diversion of the packet is completed means that the diversion of the packet between the DPI device and the slave device is completed; when the packet needs to be diverted to multiple slave devices, that the diversion of the packet is completed means that diversion of the packet between the DPI device and all slave devices is completed; that is to say, when the packet only needs to be diverted to one slave device, the diversion of the packet is completed as long as the diversion of the packet is completed once, and when the packet needs to be diverted to multiple slave devices, the diversion of the packet is not completed until multiple times of diversion of the packet are completed; and a sending unit 60, configured to: after the determining unit 50 determines that the diversion of the packet is completed, remove the inner Vlan header in the packet, and continue to transmit the packet through a communication link for receiving the packet.

The inner Vlan header may further include a link number field corresponding to the link, where the link number field contains a link identifier of the communication link for receiving the packet. The sending unit 60 may be specifically configured to: continue to transmit the packet through a communication link corresponding to the link identifier in the link number field in the inner Vlan header.

Preferably, the diversion identifier field includes 8 bits, and the link number field includes 4 bits. For example, in the diversion identifier field, the value of the bit corresponding to the slave device to which the packet needs to be diverted is set to 1, and the value of the bit corresponding to the slave device to which the packet does not need to be diverted is set to 0.

The packet carrying the inner Vlan header is preferably diverted, in sequence according to order from left to right or from right to left of the diversion identifier field, to slave devices to which the packet needs to be diverted.

Specifically, the diverting unit 40 may record a diversion operation process in the diversion identifier field of the inner Vlan header and divert the diversion operation process together with the packet. Then, in this case, the following two manners may be adopted to determine whether the diversion of the packet is completed.

In the first manner, before the packet carrying the inner Vlan header is to be diverted to a slave device, a bit which is in the diversion identifier field and corresponds to the slave device is set to a diversion completion identifier. Then, according to whether each bit of the diversion identifier field in the packet diverted back from the slave device is the non-diversion identifier or diversion completion identifier, the determining unit 50 may determine whether the diversion of the packet is completed.

In the second manner, after the packet carrying the inner Vlan header is diverted back from a slave device, a bit which is in the diversion identifier field and corresponds to the slave device is set to a diversion completion identifier. Then, after the packet carrying the inner Vlan header is diverted back from a certain slave device and a bit which is in the diversion identifier field and corresponds to the slave device is set to the diversion completion identifier, and by determining whether each bit in the diversion identifier field is the non-diversion identifier or diversion completion identifier, the determining unit may determine whether the diversion of the packet is completed.

In another implementation manner, when a switch is further included between the deep packet inspection device and each slave device, when adding the inner Vlan header to the packet, the processing unit 30 may further be configured to: add an outer Vlan header to the packet according to preset fourth correspondence between a slave device identifier and a switch port number, where a value of the outer Vlan header is a switch port number corresponding to the slave device to which the packet is to be diverted.

The diverting unit 40 may be configured to divert the packet to the corresponding slave device through a switch port corresponding to the value of the outer Vlan header, where the packet carries the inner Vlan header and outer Vlan header.

The sending unit 60 may be configured to: after the diversion of the packet is completed, remove the inner Vlan header and outer Vlan header in the packet, and continue to transmit the packet through the communication link for receiving the packet.

The deep packet inspection device in this embodiment provides a packet diversion function. The inner Vlan header carrying the diversion identifier field is added to the packet, to indicate multiple times of diversion of the packet in the same cluster, thereby reducing the processing load of the DPI device. The deep packet inspection device in this embodiment can provide the user with the personalized service customized by the user.

Many contents of the embodiment of the deep packet inspection device are similar to those of the method embodiment part. Therefore, the introduction is relatively brief. For related contents, reference may be made to the method embodiment part, and the description is not repeated in detail herein. In the foregoing embodiments, descriptions of the embodiments have different emphases. For a part not described in detail in some embodiment, reference may be made to relevant descriptions in other embodiments.

It should be noted that the relational terms herein such as first and second are used only to differentiate one entity or operation from another entity or operation, and do not require or imply any actual relationship or sequence between these entities or operations. Moreover, the terms "include", "contain", and any other variation are intended to cover a non-exclusive containment. Therefore, a process, a method, an object, or a device that includes a series of elements not only includes these elements, but also includes other elements not specified expressly, or may further include inherent elements of the process, method, object, or device. In a case where no more limitations are imposed, an element limited by "including one . . . " means that other same elements may also exist in the process, method, object, or device that includes the element.

What are described above are only some exemplary embodiments of the present invention, but not intended to limit the protection scope of the present invention. Any modification, equivalent replacement, and improvement made within the spirit and principle of the present invention fall within the protection scope of the present invention.

What is claimed is:

1. A packet diversion method, comprising:
  receiving a packet, wherein the packet contains a user identifier;
  according to the user identifier and preset first correspondence between the user identifier and a service type, searching for the service type corresponding to the user identifier in the packet;
  adding an inner virtual local area network (Vlan) header to the packet according to the service type, preset second correspondence between a service type and a slave device identifier, and preset third correspondence between a slave device identifier and each bit in a diversion identifier field, wherein the inner Vlan header comprises a diversion identifier field, and the diversion identifier field contains a diversion identifier; and
  diverting the packet to a corresponding slave device according to the diversion identifier in the diversion identifier field, wherein the packet carries the inner Vlan header, and at least one such slave device is comprised, the diversion refers to a process that one network device gives a packet to another network device for processing, and the other network device returns the packet after the processing is completed.

2. The method according to claim 1, further comprising:
  determining whether diversion of the packet is completed; and
  after the diversion of the packet is completed, removing the inner Vlan header in the packet, and continuing to transmit the packet through a communication link for receiving the packet.

3. The method according to claim 2, wherein the inner Vlan header further comprises a link number field, and the link number field contains a link identifier of the communication link for receiving the packet; and
  the continuing to transmit the packet through the communication link for receiving the packet comprises:
  continuing to transmit the packet through a communication link corresponding to the link identifier in the link number field of the inner Vlan header.

4. The method according to claim 3, further comprising:
  adding an outer Vlan header to the packet according to preset fourth correspondence between a slave device identifier and a switch port number, wherein a value of the outer Vlan header is a switch port number corresponding to a slave device to which the packet is to be diverted, wherein
  the diverting the packet to the corresponding slave device according to the diversion identifier in the diversion identifier field, wherein the packet carries the inner Vlan header, comprises:
  diverting the packet to the corresponding slave device through a switch port corresponding to the value of the outer Vlan header, wherein the packet carries the inner Vlan header and outer Vlan header; and
  after the diversion of the packet is completed, the removing the inner Vlan header in the packet, and continuing to transmit the packet through the communication link for receiving the packet comprises:
  after the diversion of the packet is completed, removing the inner Vlan header and outer Vlan header in the packet, and continuing to transmit the packet through the communication link for receiving the packet.

5. The method according to claim 2, wherein the determining whether the diversion of the packet is completed comprises:
  if a diversion operation process of the packet is recorded independently, when a record of the packet diversion process indicates that the diversion of the packet is completed, confirming that the diversion of the packet is completed; or
  if a diversion operation process is recorded in the diversion identifier field and diverted together with the packet, when the diversion identifier field of the packet diverted back comprises no diversion identifier, confirming that the diversion of the packet is completed.

6. The method according to claim 2, further comprising:
  adding an outer Vlan header to the packet according to preset fourth correspondence between a slave device identifier and a switch port number, wherein a value of the outer Vlan header is a switch port number corresponding to a slave device to which the packet is to be diverted, wherein
  the diverting the packet to the corresponding slave device according to the diversion identifier in the diversion identifier field, wherein the packet carries the inner Vlan header, comprises:
  diverting the packet to the corresponding slave device through a switch port corresponding to the value of the outer Vlan header, wherein the packet carries the inner Vlan header and outer Vlan header; and
  after the diversion of the packet is completed, the removing the inner Vlan header in the packet, and continuing to transmit the packet through the communication link for receiving the packet comprises:
  after the diversion of the packet is completed, removing the inner Vlan header and outer Vlan header in the packet, and continuing to transmit the packet through the communication link for receiving the packet.

7. A deep packet inspection device comprising:
  a receiving unit, configured to receive a packet, wherein the packet contains a user identifier;
  a searching unit, configured to search, according to the user identifier and preset first correspondence between the user identifier and a service type, for the service type corresponding to the user identifier in the packet;
  a processing unit, configured to add an inner virtual local area network (Vlan) header to the packet according to the service type, preset second correspondence between a service type and a slave device identifier, and preset third correspondence between a slave device identifier and each bit in a diversion identifier field, wherein the inner Vlan header comprises a diversion identifier field, and the diversion identifier field contains a diversion identifier; and
  a diverting unit, configured to divert the packet to a corresponding slave device according to the diversion identifier in the diversion identifier field, wherein the packet carries the inner Vlan header, and at least one such slave device is comprised, the diversion refers to a process that one network device gives a packet to another network device for processing, and the other network device returns the packet after the processing is completed.

8. The deep packet inspection device according to claim 7, further comprising:
- a determining unit, configured to determine whether diversion of the packet is completed; and
- a sending unit, configured to: after the diversion of the packet is completed, remove the inner Vlan header in the packet, and continue to transmit the packet through a communication link for receiving the packet.

9. The deep packet inspection device according to claim 8, wherein:
- the inner Vlan header further comprises a link number field, and the link number field contains a link identifier of the communication link for receiving the packet;
- and the sending unit is configured to
- continue to transmit the packet through a communication link corresponding to the link identifier in the link number field of the inner Vlan header.

10. The deep packet inspection device according to claim 8, wherein:
- the processing unit is further configured to add an outer Vlan header to the packet according to preset fourth correspondence between a slave device identifier and a switch port number, wherein a value of the outer Vlan header is a switch port number corresponding to a slave device to which the packet is to be diverted
- the diverting unit is configured to divert the packet to the corresponding slave device through a switch port corresponding to the value of the outer Vlan header, wherein the packet carries the inner Vlan header and outer Vlan header;
- the sending unit is configured to: after the diversion of the packet is completed, remove the inner Vlan header and outer Vlan header in the packet, and continue to transmit the packet through the communication link for receiving the packet.

* * * * *